US012625019B2

(12) United States Patent
Wei et al.

(10) Patent No.: US 12,625,019 B2
(45) Date of Patent: May 12, 2026

(54) PRESSURE SENSOR, MANUFACTURING METHOD THEREOF AND PRESSURE DETECTION DEVICE

(71) Applicants: Beijing BOE Optoelectronics Technology Co., Ltd., Beijing (CN); BOE TECHNOLOGY GROUP CO., LTD., Beijing (CN)

(72) Inventors: Qiuxu Wei, Beijing (CN); Yue Li, Beijing (CN); Lihui Wang, Beijing (CN); Weilong Guo, Beijing (CN); Yanfei Ren, Beijing (CN); Taonan Zhang, Beijing (CN); Wenbo Chang, Beijing (CN); Jie Sun, Beijing (CN); Nana He, Beijing (CN); Shaohua Wu, Beijing (CN); Guochen Du, Beijing (CN); Ding Ding, Beijing (CN); Feng Qu, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 298 days.

(21) Appl. No.: 18/686,517

(22) PCT Filed: Jan. 3, 2023

(86) PCT No.: PCT/CN2023/070030
§ 371 (c)(1),
(2) Date: Feb. 26, 2024

(87) PCT Pub. No.: WO2024/145728
PCT Pub. Date: Jul. 11, 2024

(65) Prior Publication Data
US 2024/0426680 A1 Dec. 26, 2024

(51) Int. Cl.
*G01L 9/00* (2006.01)
*G01L 1/14* (2006.01)

(52) U.S. Cl.
CPC .................................. *G01L 1/144* (2013.01)

(58) Field of Classification Search
CPC ......... G01L 1/144; G01L 27/00; G01L 1/142; G01L 7/08; G01L 7/02; G01L 9/003;
(Continued)

(56) References Cited

U.S. PATENT DOCUMENTS

| | | | | |
|---|---|---|---|---|
| 5,561,247 A | * | 10/1996 | Mutoh | G01L 9/0075 73/723 |
| 2013/0001550 A1 | * | 1/2013 | Seeger | G01L 9/0073 438/15 |
| 2018/0327257 A1 | | 11/2018 | Feyh et al. | |

FOREIGN PATENT DOCUMENTS

| | | |
|---|---|---|
| CN | 102235925 A | 11/2011 |
| CN | 103708409 A | 4/2014 |
(Continued)

*Primary Examiner* — Robert R Raevis
(74) *Attorney, Agent, or Firm* — HOUTTEMAN LAW LLC

(57) ABSTRACT

An MEMS pressure sensor, a method for manufacturing an MEMS pressure sensor, and a pressure detection device are provided. The MEMS pressure sensor includes: an adapter board; an integrated circuit chip on one side of the adapter board; and a sensor chip on a side of the adapter board away from the integrated circuit chip. The sensor chip includes a first electrode and a second electrode, and the first electrode is between the adapter board and the second electrode; the second electrode includes a pressure-sensitive portion opposite to the first electrode and an edge portion surrounding the pressure-sensitive portion, the edge portion is fixed onto the adapter board by a bonding layer, and the first electrode, the second electrode, the bonding layer and the adapter board define a cavity. The first and second electrodes of the sensor (Continued)

chip are electrically connected to the integrated circuit chip through the adapter board.

20 Claims, 11 Drawing Sheets

(58) Field of Classification Search
CPC ... G01L 9/0038; G01L 9/0072; G01L 9/0086; G01L 9/12; B81C 1/00
USPC ......... 73/862.636, 862.68, 861.47, 718–721, 73/724; 200/83 A; 361/283.1, 283.3, 361/283.4
See application file for complete search history.

(56) References Cited

FOREIGN PATENT DOCUMENTS

| | | | | | |
|---|---|---|---|---|---|
| CN | 105092104 | A | 11/2015 | | |
| CN | 105092111 | A | 11/2015 | | |
| CN | 107758606 | A | 3/2018 | | |
| CN | 112798158 | A | 5/2021 | | |
| CN | 114199420 | A | * 3/2022 | ............... | G01L 9/12 |
| CN | 217276593 | U | 8/2022 | | |
| JP | 1114482 | A | 1/1999 | | |
| JP | 2013522646 | A | * 6/2013 | ............. | A61B 5/021 |

* cited by examiner

Forming a sensor chip on one side of an adapter board, wherein the sensor chip includes: a first electrode and a second electrode — S1

Forming an integrated circuit chip on a side of the adapter board away from the sensor chip, and electrically connecting the first electrode and the second electrode of the sensor chip to the integrated circuit chip through the adapter board — S2

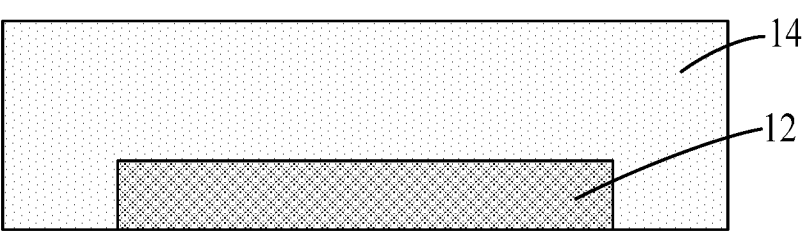

FIG. 7A

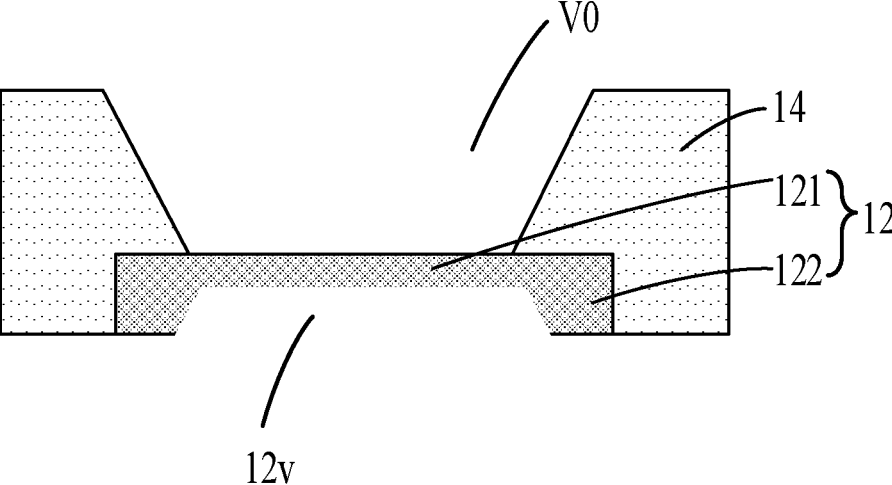

PRESSURE SENSOR, MANUFACTURING METHOD THEREOF AND PRESSURE DETECTION DEVICE

TECHNICAL FIELD

The present disclosure relates to the field of sensing technology, and in particular to a pressure sensor, a method for manufacturing a pressure sensor and a pressure detection device.

BACKGROUND

A micro-electro mechanical system (MEMS) belongs to an emerging interdisciplinary high and new technology research field. A pressure sensor manufactured by the MEMS technology has the advantages of small volume, easy integration, reliable performance, capability of realizing a conversion from a non-electric signal to an electric signal and the like, and thus is commonly used for pressure measurement in the fields of consumption, automobiles, aerospace, petrifaction, biomedical treatment and the like.

SUMMARY

The present disclosure provides a pressure sensor, a method for manufacturing a pressure sensor and a pressure detection device.

In a first aspect, the present disclosure provides an MEMS pressure sensor, including: an adapter board; an integrated circuit chip on one side of the adapter board; and a sensor chip on a side of the adapter board away from the integrated circuit chip; the sensor chip includes a first electrode and a second electrode, and the first electrode is between the adapter board and the second electrode; the second electrode includes: a pressure-sensitive portion opposite to the first electrode and an edge portion surrounding the pressure-sensitive portion, the edge portion is fixed on the adapter board by a bonding layer, and the first electrode, the second electrode, the bonding layer and the adapter board define a cavity; and the first electrode and the second electrode of the sensor chip are electrically connected to the integrated circuit chip through the adapter board.

In some embodiments, the integrated circuit chip includes a first detection terminal and a second detection terminal; and the adapter board includes: a substrate body, a first connection component and a second connection component, the first connection component passes through the first via in the substrate body and is electrically connected to the first electrode and the first detection terminal, and the second connection component passes through the second via in the substrate body and is electrically connected to the bonding layer and the second detection terminal.

In some embodiments, the MEMS pressure sensor further includes: a dielectric layer on a side of the adapter board away from the sensor chip; a first conductive component, at least one portion of the first conductive component being in a third via in the dielectric layer, and the first conductive component electrically connecting the first connection component to the first detection terminal; and a second conductive component, at least one portion of the second conductive component being in a fourth via in the dielectric layer, and the second conductive component electrically connecting the second connection component to the second detection terminal.

In some embodiments, the MEMS pressure sensor further includes: a transmission line between the dielectric layer and the adapter board; a third conductive component, at least one portion of the third conductive component being in a fifth via in the dielectric layer, and the third conductive component electrically connecting a signal terminal of the integrated circuit chip to the transmission line; and a fourth conductive component, a portion of the fourth conductive component being in a sixth via in the dielectric layer and electrically connected to the transmission line.

In some embodiments, the sensor chip further includes a base substrate, and the second electrode is on a side of the base substrate close to the adapter board.

In some embodiments, the second electrode and the base substrate have a one-piece structure.

In some embodiments, the MEMS pressure sensor further includes a first groove on a side of the base substrate away from the adapter board, and the first groove exposes the pressure-sensitive portion of the second electrode.

In some embodiments, the adapter board includes a substrate body, and the base substrate and the substrate body are made of different materials.

In some embodiments, the MEMS pressure sensor further includes a second groove in a surface of the second electrode close to the first electrode, an orthographic projection of the second groove on the adapter board covers an orthographic projection of the first electrode on the adapter board, and an orthographic projection of the bonding layer on the adapter board surrounds an orthographic projection of the second groove on the adapter board.

In some embodiments, the MEMS pressure sensor further includes a receiving groove in a surface of the adapter board away from the sensor chip, and the integrated circuit chip is located in the receiving groove.

In a second aspect, the present disclosure provides a method for manufacturing an MEMS pressure sensor, including: forming a sensor chip on one side of an adapter board, such that the sensor chip includes: a first electrode and a second electrode, the first electrode is provided between the adapter board and the second electrode, the second electrode includes: a pressure-sensitive portion opposite to the first electrode and an edge portion surrounding the pressure-sensitive portion, the edge portion is fixed on the adapter board by a bonding layer, and the first electrode, the second electrode, the bonding layer and the adapter board define a cavity; and forming an integrated circuit chip on a side of the adapter board away from the sensor chip, and electrically connecting the first electrode and the second electrode of the sensor chip to the integrated circuit chip through the adapter board.

In some embodiments, the integrated circuit chip includes a first detection terminal and a second detection terminal, and the adapter board includes a substrate body; the electrically connecting the first electrode and the second electrode of the sensor chip to the integrated circuit chip through the adapter board includes: forming a first via and a second via in the substrate body; forming a first connection component and a second connection component, such that the first connection component passes through the first via and is electrically connected to the first electrode, and the second connection component passes through the second via and is electrically connected to the bonding layer; and electrically connecting the first detection terminal to the first connection component, and electrically connecting the second detection terminal to the second connection component.

In some embodiments, the forming the sensor chip on one side of the adapter board includes: performing a doping process on a first portion of an insulating substrate to conductorize the first portion of the insulating substrate, to form the second electrode, such that a remaining portion of the insulating substrate is used as a base substrate; etching the second electrode to form a second groove in the second electrode; forming the first electrode and the bonding layer on the adapter board; and placing the pressure-sensitive portion of the second electrode opposite to the first electrode, and bonding the edge portion of the second electrode to the bonding layer.

In some embodiments, the etching the second electrode includes: simultaneously etching the second electrode and the base substrate by using etching liquid, to form a first groove exposing some regions of the second electrode in the base substrate, and form the second groove on a side of the second electrode away from the first groove.

In some embodiments, after forming the first connection component and the second connection component, the method further includes: forming a dielectric layer, forming a third via at a position corresponding to the first connection component in the dielectric layer, and forming a fourth via at a position corresponding to the second connection component in the dielectric layer; and forming a first conductive component and a second conductive component, such that at least a portion of the first conductive component is located in the third via, and at least a portion of the second conductive component is located in the fourth via; and the electrically connecting the first detection terminal to the first connection component, and the electrically connecting the second detection terminal to the second connection component includes: electrically connecting the first connection component to the first detection terminal through the first conductive component, and electrically connecting the second connection component to the second detection terminal through the second conductive component.

In some embodiments, prior to the forming the dielectric layer, the method further includes: forming a transmission line on the adapter board; after the dielectric layer is formed, the method further includes: forming a fifth via and a sixth via in the dielectric layer; forming a third conductive component and a fourth conductive component, such that the third conductive component is connected to one end of the transmission line through the fifth via, and the fourth conductive component is connected to the other end of the transmission line through the sixth via; and connecting a signal terminal of the integrated circuit chip to the third conductive component.

In some embodiments, the transmission line is formed in synchronization with the first connection component and the second connection component.

In a third aspect, the present disclosure further provides a pressure detection device, including: the above MEMS pressure sensor; and a printed circuit board electrically connected to the integrated circuit chip and configured to provide an operating signal to the integrated circuit chip.

BRIEF DESCRIPTION OF DRAWINGS

The accompanying drawings, which are provided for further understanding of the present disclosure and constitute a part of this specification, are for explaining the present disclosure together with the embodiments of the present disclosure, but are not intended to limit the present disclosure. In the drawings:

FIG. 6 is a flow chart of a method for manufacturing an MEMS pressure sensor provided in some embodiments of the present disclosure.

FIGS. 7A to 7J are schematic diagrams illustrating a manufacturing procedure for an MEMS pressure sensor provided in some embodiments of the present disclosure.

DETAIL DESCRIPTION OF EMBODIMENTS

Figure 1A:
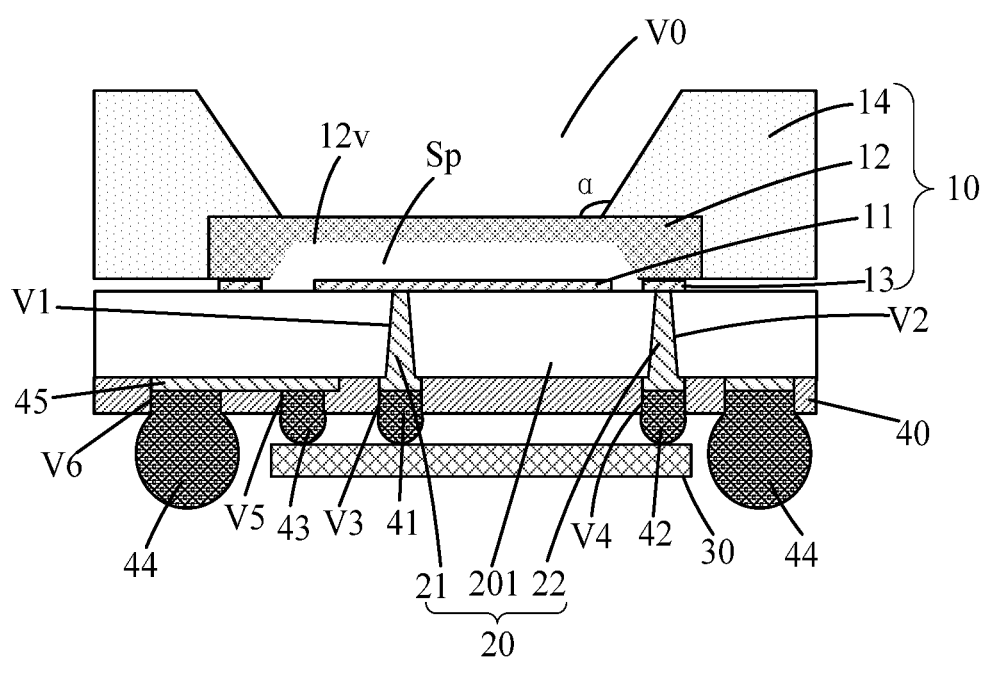
FIG. 1A is a schematic diagram of an MEMS pressure sensor provided in some embodiments of the present disclosure.

The detail description of embodiments will be described below in detail by referring to the accompanying drawings. It should be understood that the detail description of embodiments described here is for the purpose of illustrating and explaining the present disclosure only and is not intended to limit the present disclosure.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few, and not all, embodiments of the present disclosure. All other embodiments, which can be derived by a person skilled in the art from the embodiments of the present disclosure without any creative effort, are within the protective scope of the present disclosure.

The terms used herein to describe the embodiments of the present disclosure are not intended to limit and/or define the scope of the present disclosure. For example, unless defined otherwise, technical or scientific terms used herein shall have the ordinary meaning as understood by one of ordinary skill in the art to which the present disclosure belongs. It should be understood that the terms "first", "second", and the like used in the present disclosure are not intended to indicate any order, quantity, or importance, but rather are used for distinguishing one element from another. Further, unless the context clearly dictates otherwise, the singular term "a", "an", "the", or the like used herein does not denote a limitation of quantity, but rather denotes the presence of at least one element. The term "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

It should be noted that the expression "in a range from m1 to m2" in the embodiments of the present disclosure includes end points m1 and m2.

A micro-electro mechanical system (MEMS) belongs to an emerging interdisciplinary high and new technology research field. A pressure sensor manufactured by the MEMS technology has the advantages of small volume, easy integration, reliable performance, capability of realizing a conversion from a non-electric signal to an electric signal and the like, and thus is commonly used for pressure measurement in the fields of consumption, automobiles, aerospace, petrifaction, biomedical treatment and the like.

The MEMS pressure sensor includes a sensor chip and an integrated circuit (ASIC) chip, the sensor chip is configured to convert sensed pressure into an electric signal, and the integrated circuit chip is configured to process the electric signal output by the sensor chip so as to determine a magnitude of the pressure. In the related art, the sensor chip and the integrated circuit chip are electrically connected to each other by wire bonding. The wires and their soldering points have the risks of fracture and de-soldering under the environmental influences of long vibration, high and low temperature impact and the like, so that the service life of the MEMS pressure sensor is shortened.

FIG. 1A is a schematic diagram of an MEMS pressure sensor provided in some embodiments of the present disclosure. As shown in FIG. 1A, the MEMS pressure sensor includes: an adapter board 20, a sensor chip 10, and an integrated circuit chip 30.

Figure 1B:
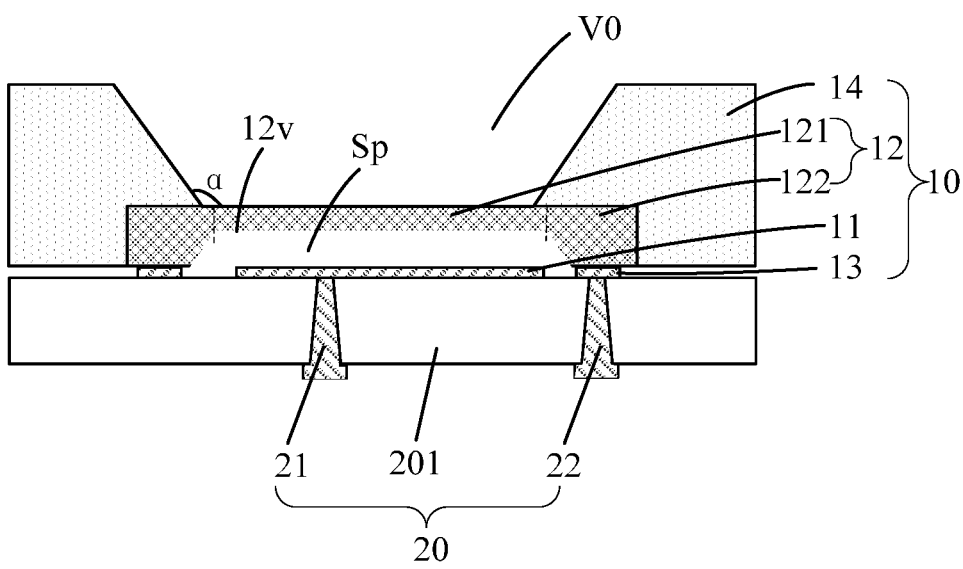
FIG. 1B is a schematic diagram of a sensor chip and an adapter board provided in some embodiments of the present disclosure.

The sensor chip 10 and the integrated circuit chip 30 are located on opposite sides of the adapter board 20, respectively. FIG. 1B is a schematic diagram of a sensor chip and an adapter board provided in some embodiments of the present disclosure. As shown in FIGS. 1A and 1B, the sensor chip 10 includes: a first electrode 11 on the adapter board 20 and a second electrode 12 on a side of the first electrode 11 away from the adapter board 20. The second electrode 12 includes: a pressure-sensitive portion 121 and an edge portion 122 surrounding the pressure-sensitive portion 121. The first electrode 11 is opposite to the pressure-sensitive portion 121 of the second electrode 12, and the first electrode 11 and the second electrode 12 are insulated and spaced apart from each other. The edge portion 122 is fixed on the adapter board 20 by a bonding layer 13. The first electrode 11, the second electrode 12, the bonding layer 13 and the adapter board 20 define a cavity Sp isolated from the external environment.

The integrated circuit chip 30 is located on a side of the adapter board 20 away from the sensor chip 10. The first electrode 11 and the second electrode 12 are electrically connected to the integrated circuit chip 30 through the adapter board 20.

The first electrode 11 and the second electrode 12 form a detection capacitor, and the integrated circuit chip 30 is electrically connected to the first electrode 11 and the second electrode 12 through the adapter board 20, so that electrical signals on the first electrode 11 and the second electrode 12 may be detected, and a capacitance of the detection capacitor formed by the first electrode 11 and the second electrode 12 may be detected. When the second electrode 12 is deformed due to a pressure applied onto the second electrode 12, a distance between the first electrode 11 and the second electrode 12 changes, the capacitance of the detection capacitor changes, and the signal detected by the integrated circuit chip 30 changes. The integrated circuit chip 30 may determine the magnitude of the pressure based on the varying signal.

In the embodiment of the present disclosure, the sensor chip 10 and the integrated circuit chip 30 are respectively disposed on two opposite sides of the adapter board 20, and are connected to each other through the adapter board 20. Compared with the case where the sensor chip and the integrated circuit chip are connected to each other by the wire bonding, in the embodiment of the present disclosure, the connection stability between the sensor chip 10 and the integrated circuit chip 30 can be improved. In addition, the sensor chip 10 and the integrated circuit chip 30 form a stacked design, so that an area occupied by the whole MEMS pressure sensor can be reduced, and a small-sized package can be realized.

In some embodiments, the integrated circuit chip 30 includes a first detection terminal and a second detection terminal. As shown in FIG. 1A, the adapter board 20 includes a substrate body 201, a first connection component 21 and a second connection component 22, a first via V1 is formed at a position corresponding to the first electrode 11 in the substrate body 201, and a second via V2 is formed at a position corresponding to the bonding layer 13 in the substrate body 201. The first connection component 21 passes through the first via V1 in the adapter board 20 and is electrically connected to the first electrode 11 and the first detection terminal of the integrated circuit chip 30. The second connection component 22 passes through the second via V2 in the adapter board 20 and is electrically connected to the bonding layer 13 and the second detection terminal of the integrated circuit chip 30.

The sensor chip 10 further includes a base substrate 14, and the second electrode 12 is disposed on a side of the base substrate 14 close to the adapter board 20.

In some embodiments, the second electrode 12 and the base substrate 14 have a one-piece structure. For example, the second electrode 12 is an electrode formed by performing a doping process on a first portion of an insulating substrate. The base substrate 14 is a portion of the insulating substrate other than the first portion. For example, the insulating substrate is a silicon substrate, the first portion of the silicon substrate is modified by the doping process such as an ion implantation process or a diffusion process, to form the second electrode 12, and the remaining unmodified portion is used as the base substrate 14. A resistivity of the base substrate 14 is greater than 1 Ω·cm. A thickness of the silicon substrate is in a range from 50 μm to 700 μm. A sheet resistance of the second electrode 12 is less than 100 Ω/□.

In some embodiments, as shown in FIGS. 1A and 1B, a surface of the second electrode 12 close to the first electrode 11 is provided with a second groove 12v therein, and the second groove 12v is located in the pressure-sensitive portion 121, so that the cavity Sp is formed between the first electrode 11 and the second electrode 12. An orthographic projection of the second groove 12v on the adapter board 20 covers an orthographic projection of the first electrode 11 on the adapter board 20, and an orthographic projection of the bonding layer 13 on the adapter board 20 surrounds the orthographic projection of the second groove 12v on the adapter board 20.

A depth of the second groove 12v is in a range from 0.1 μm to 3 μm, and the orthographic projection of the second groove 12v on the adapter board 20 may have a rectangular shape, a circular shape or other shape. In one example, the shape of the orthographic projection of the second groove 12$v$ on the adapter board 20 is a rectangle, and a length and a width of the rectangle are both between 0.5 mm and 5 mm.

In one example, a portion of the second electrode 12 corresponding to the second groove 12$v$ has a thickness in a range from 5 μm to 50 μm, so that the pressure-sensitive portion 121 of the second electrode 12 is deformed when being pressed.

In some embodiments, the second groove 12$v$ in the second electrode 12 may be formed by an etching process. In the preparation process, the base substrate 14 with the second electrode 12 formed thereon may be placed in an etching solution, so that the second electrode 12 and the base substrate 14 are etched simultaneously, thereby forming the second groove 12V in the second electrode 12, and forming a first groove V0 on a side of the base substrate 14 away from the adapter board 20. As shown in FIG. 1A, the first groove V0 exposes the pressure-sensitive portion 121 of the second electrode 12, so that the second electrode 12 is easily deformed when the sensor chip 10 is pressed.

A cross-sectional area of the first groove V0 gradually decreases in a direction from the first electrode 11 to the second electrode 12. For example, a longitudinal section of the first groove V0 has an inverted trapezoid shape, and an angle α between a base and a waist of the inverted trapezoid shape is between 100° and 150°, e.g., α is 100°, or 105.5°, or 120°, or 122.3°, or 125.3°, or 130°, or 135.3°, or 150°.

It should be noted that in the embodiment of the present disclosure, a cross section of a component refers to a cross section of the component perpendicular to a thickness direction of the adapter board 20, and the longitudinal section of the component refers to a longitudinal section of the component parallel to the thickness direction of the adapter board 20.

In some embodiments, the substrate body 201 of the adapter board 20 is made of a different material than the base substrate 14. For example, the substrate body 201 is a glass substrate, and the glass substrate and the base substrate 14 have similar thermal expansion coefficients, so as to prevent thermal mismatch between the glass substrate and the base substrate 14 caused by the change of the ambient temperature. In one example, the substrate body 201 may have a thickness in a range from 50 μm to 700 μm.

Figure 2:
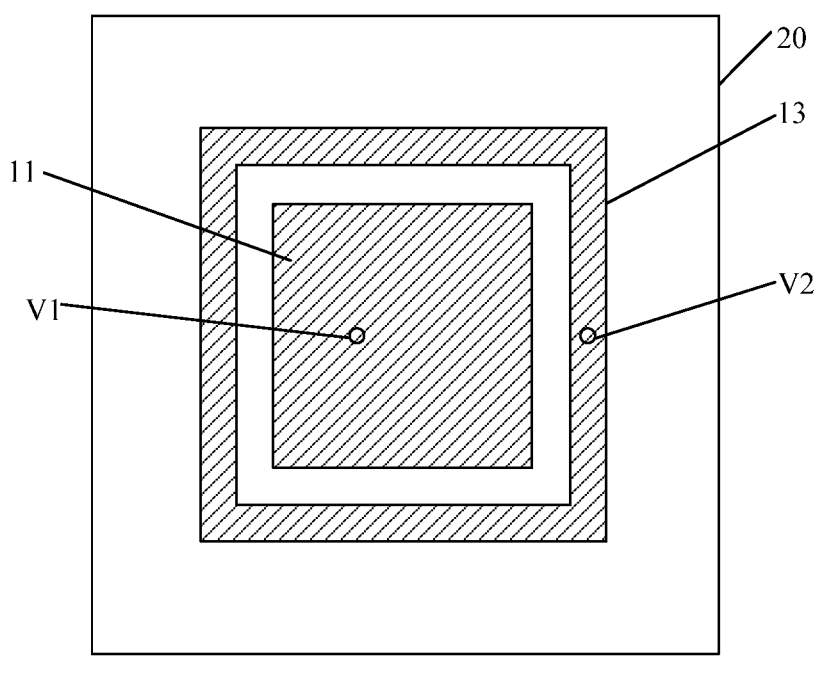
FIG. 2 is a plan view of a bonding layer and a first electrode provided in some embodiments of the present disclosure.

FIG. 2 is a plan view of a bonding layer and a first electrode provided in some embodiments of the present disclosure. As shown in FIG. 2, in some embodiments, the bonding layer 13 is a frame structure with a width between 5 μm and 50 μm. The bonding layer 13 has a thickness in a range from 10 nm to 1000 nm, is made of Ti/Au or Cr/Au or the like, and is used for forming wafer bonding between the second electrode 12 and the adapter board 20.

In some embodiments, the first electrode 11 may have a rectangular structure with a length and a width both between 0.5 mm and 5 mm. The first electrode 11 is made of Ti/Au or Cr/Au or the like, and has a thickness in a range from 10 nm to 1000 nm. The first electrode 11 and the bonding layer 13 may be formed simultaneously by a single patterning process.

In some embodiments, cross sections of the first via V1 and the second via V2 are each circular, elliptical, rectangular, or other shape. In one example, as shown in FIG. 2, the cross sections of the first via V1 and the second via V2 are both circular, and an opening diameter of the first via V1 close to the second electrode 12 and an opening diameter of the first via V1 away from the second electrode 12 are both between 5 μm and 50 μm. An opening diameter of the second via V2 close to the second electrode 12 and an opening diameter of the second via V2 away from the second electrode 12 are both between 5 μm and 50 μm. In one example, both longitudinal sections of the first via V1 and the second via V2 are trapezoidal or rectangular, and an angle between a side and a bottom of each longitudinal section is between 75° and 90°. In one example, the angle between the side and the bottom of each longitudinal section is in a range from 80° to 85°, or in a range from 85° to 88°, such as 80°, or 82.5°, or 84°, or 84.5°, or 85°, or 87.5°, or 88°. The bottom of the longitudinal section refers to a side of the longitudinal section away from the sensor chip 10.

In one example, the first connection component 21 may include a first body portion and a first adhesion layer located between the first body portion and a wall of the first via V1, and the second connection component 22 may include a second body portion and a second adhesion layer located between the second body portion and a wall of the second via V2. The first body portion and the second body portion may be made of Cu, W, Al or the like, and the first adhesion layer and the second adhesion layer may be made of Ti/Cu stack or TaN/Cu stack.

As shown in FIG. 1A, the MEMS pressure sensor further includes: a dielectric layer 40, a first conductive component 41, and a second conductive component 42. The dielectric layer 40 is located on a side of the adapter board 20 away from the sensor chip 10. The dielectric layer 40 may be made of PI, SiO, SiN or the like, and have a thickness in a range from 0.1 μm to 10 μm.

A third via V3 is provided at a position corresponding to the first via V1 in the dielectric layer 40, and a fourth via V4 is provided at a position corresponding to the second via V2 in the dielectric layer 40. In one example, both orthographic projections of the third via V3 and the fourth via V4 on the adapter board 20 are circular or other shapes. At least a portion of the first conductive component 41 is positioned in the third via V3, and the first conductive component 41 electrically connects the first connection component 21 with the first detection terminal. At least a portion of the second conductive component 42 is positioned in the fourth via V4, and the second conductive component 42 electrically connects the second connection component 22 with the second detection terminal. In some embodiments, there is a spacing between the orthographic projections of the first conductive component 41 and the second conductive component 42 on the adapter board 20, and the orthographic projection of the first conductive component 41 on the adapter board 20 is positioned in the orthographic projection of the first electrode 11 on the adapter board 20, and the orthographic projection of the second conductive component 42 on the adapter board 20 overlaps with the orthographic projection of the bonding layer 13 on the adapter board 20.

The first conductive component 41 and the second conductive component 42 may each be made of a pad material NiPdAu or a Sn solder, the first conductive component 41 may be soldered to the first detection terminal, and the second conductive component 42 may be soldered to the second detection terminal. In one example, the orthographic projections of the first conductive component 41 and the second conductive component 42 on the adapter board 20 both have circular shapes, and a diameter of each circular shape is between 10 μm and 100 μm.

Figure 3:
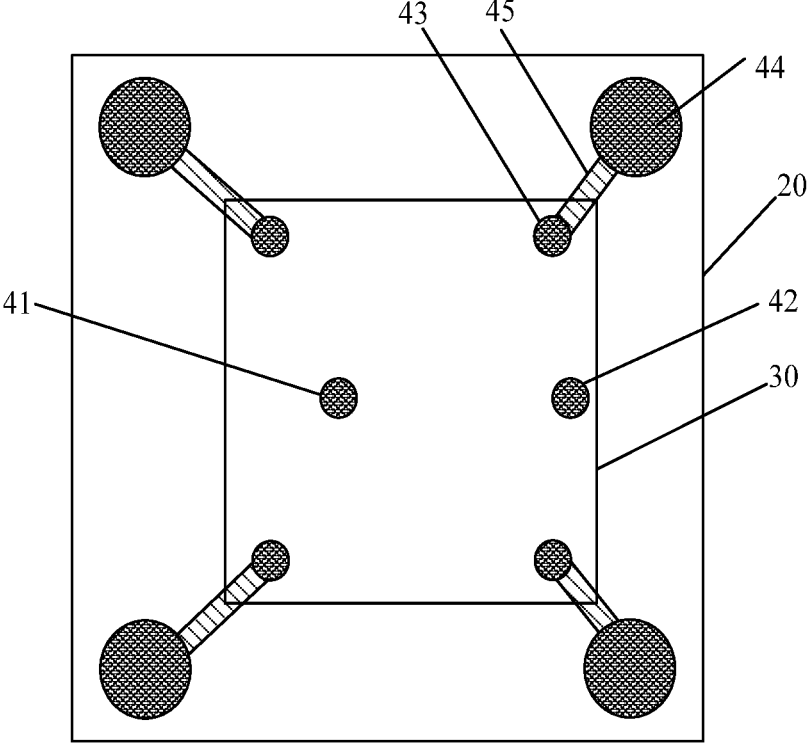
FIG. 3 is a bottom view of an MEMS pressure sensor provided in some embodiments of the present disclosure.

FIG. 3 is a bottom view of an MEMS pressure sensor provided in some embodiments of the present disclosure. As shown in conjunction with FIGS. 1A and 3, in some embodiments, the MEMS pressure sensor further includes: a transmission line 45, a third conductive component 43, and a fourth conductive component 44. The transmission line 45 is located between the dielectric layer 40 and the adapter board 20. In one example, the transmission line 45 is made of the same material as the first connection component 21 and the second connection component 22. In the preparation process, the transmission line 45, the first connection component 21 and the second connection component 22 may be formed in a same step.

At least a portion of the third conductive component 43 is located in a fifth via V5 in the dielectric layer 40, one end of the third conductive component 43 is electrically connected to a signal terminal of the integrated circuit chip 30, and the other end of the third conductive component 43 is electrically connected to a first end of the transmission line 45. The third conductive component 43 may be soldered to the signal terminal of the integrated circuit chip 30.

The integrated circuit chip 30 may include a plurality of signal terminals, including a power terminal, a ground terminal, a clock terminal, a signal output terminal, and the like, where the signal output terminal is configured to output a pressure detection result of the integrated circuit chip 30.

A portion of the fourth conductive component 44 is located in a sixth via V6 in the dielectric layer 40, one end of the fourth conductive component 44 is electrically connected to a second end of the transmission line 45, and the other end of the fourth conductive component 44 is connected to the printed circuit board. Each signal terminal may correspond to one third conductive component 43, one fourth conductive component 44 and one transmission line 45, and the third conductive component 43, the fourth conductive component 44 and the transmission line 45 corresponding to each signal terminal form a signal transmission line. The printed circuit board provides a power signal, a ground signal and a clock signal to the integrated circuit chip 30 through a plurality of signal transmission lines and receives the pressure detection signal output from the integrated circuit chip 30. In one example, the fourth conductive component 44 may be connected to a power supply terminal on the printed circuit board in the signal transmission line connected to the power terminal of the integrated circuit chip 30; the fourth conductive component 44 may be connected to a ground terminal on the printed circuit board in the signal transmission line connected to the ground terminal of the integrated circuit chip 30; the fourth conductive component 44 may be connected to a clock supply terminal on the printed circuit board in the signal transmission line connected to the clock terminal of the integrated circuit chip 30; and the fourth conductive component 44 may be connected to a signal receiving terminal on the printed circuit board in the signal transmission line connected to the signal output terminal of the integrated circuit chip 30.

In some examples, orthographic projections of the third conductive component 43 and the fourth conductive component 44 on the adapter board 20 are both circular, a diameter of the orthographic projection of the third conductive component 43 on the adapter board 20 is between 10 μm and 100 μm, and a diameter of the orthographic projection of the fourth conductive component 44 on the adapter board 20 is between 100 μm and 500 μm.

In some examples, the integrated circuit chip 30 has a rectangular shape, an orthographic projection of each third conductive component 43 on the integrated circuit chip 30 is located at a corner of the integrated circuit chip 30, and an orthographic projection of the second conductive component 42 on the integrated circuit chip 30 is located between orthographic projections of two adjacent third conductive components 43 at corners on the integrated circuit chip 30. A closest distance from an orthographic projection of the first conductive component 41 on the integrated circuit chip 30 to an edge of the integrated circuit chip 30 is greater than a closest distance from the orthographic projection of any one of the third conductive components 43 on the integrated circuit chip 30 to the edge of the integrated circuit chip 30.

Figure 4:
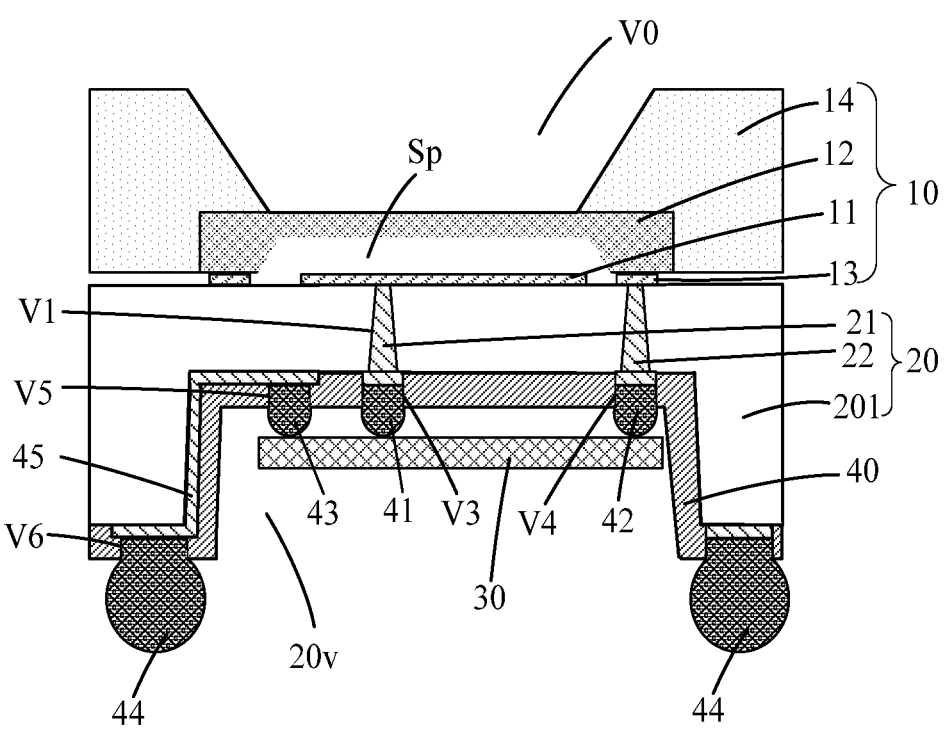
FIG. 4 is a schematic diagram of an MEMS pressure sensor provided in further embodiments of the present disclosure.
Figure 5:
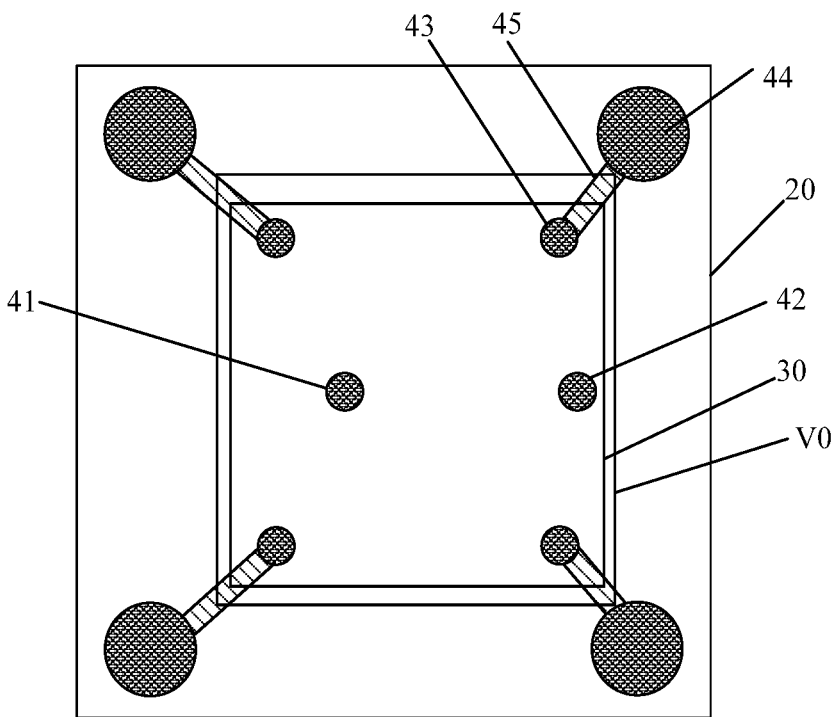
FIG. 5 is a bottom view of an MEMS pressure sensor provided in further embodiments of the present disclosure.

FIG. 4 is a schematic diagram of an MEMS pressure sensor provided in further embodiments of the present disclosure. FIG. 5 is a bottom view of an MEMS pressure sensor provided in further embodiments of the present disclosure. The MEMS pressure sensor shown in FIGS. 4 and 5 has a structure similar to that of the MEMS pressure sensor shown in FIG. 1A, except that in FIGS. 4 and 5, a surface of the adapter board 20 away from the sensor chip 10 is provided with a receiving groove 20v therein, and the integrated circuit chip 30 is located in the receiving groove 20v. In the case where the adapter board 20 has a constant thickness, a total thickness of the MEMS pressure sensor can be reduced by providing the receiving groove 20v and placing the integrated circuit chip 30 in the receiving groove 20v.

A cross-sectional shape of the receiving groove 20v may match the shape of the integrated circuit chip 30. For example, the integrated circuit chip 30 has a rectangular shape, and the cross section of the receiving groove 20v has a rectangular shape.

An embodiment of the present disclosure further provides a method for manufacturing the MEMS pressure sensor. FIG. 6 is a flow chart of a method for manufacturing an MEMS pressure sensor provided in some embodiments of the present disclosure. As shown in FIG. 6, the method for manufacturing an MEMS pressure sensor includes steps S1 to S2.

The step S1 includes forming a sensor chip on one side of an adapter board, and the sensor chip includes: a first electrode and a second electrode. The first electrode is provided on the adapter board and the second electrode is located on a side of the first electrode away from the adapter board. The second electrode includes: a pressure-sensitive portion opposite to the first electrode and an edge portion surrounding the pressure-sensitive portion. The edge portion is fixed on the adapter board by a bonding layer. The first electrode, the second electrode, the bonding layer and the adapter board define a cavity.

The step S2 includes forming an integrated circuit chip on a side of the adapter board away from the sensor chip, and electrically connecting the first electrode and the second electrode of the sensor chip to the integrated circuit chip through the adapter board.

In some embodiments, the adapter board may include a substrate body provided with a first via and a second via therein, a first connection component is disposed in the first via, a second connection component is disposed in the second via, the first electrode may be electrically connected to the integrated circuit chip through the first connection component, and the second electrode may be electrically connected to the integrated circuit chip through the second connection component.

FIGS. 7A to 7J are schematic diagrams illustrating a manufacturing procedure for an MEMS pressure sensor provided in some embodiments of the present disclosure. The procedure for manufacturing the MEMS pressure sensor is described in detail with reference to FIGS. 7A to 7J. The procedure for manufacturing the MEMS pressure sensor includes the following steps S1 to S6.

The step S1 includes forming the sensor chip 10 on one side of the adapter board 20. The sensor chip 10 includes: the first electrode 11 on the adapter board 20 and the second electrode 12 on a side of the first electrode 11 away from the adapter board 20. The second electrode 12 includes: pressure-sensitive portion 121 and the edge portion 122 surrounding the pressure-sensitive portion 121. The edge portion 122 is fixed on the adapter board 20 by the bonding layer 13. The pressure-sensitive portion 121 is arranged opposite to the first electrode 11. The first electrode 11, the second electrode 12, the bonding layer 13 and the adapter board 20 define a cavity Sp.

In particular, the step S1 includes the following steps S11 to S15.

The step S11 includes, as shown in FIG. 7A, performing a doping process (for example, a heavy doping process such as ion implantation or diffusion) on a first portion of an insulating substrate 141, to conductorize the first portion of the insulating substrate 141, thereby forming the second electrode 12, and the remaining portion of the insulating substrate 141 serves as the base substrate 14.

The insulating substrate 141 may be a silicon substrate, a depth of the conductorized part is in a range from 0.1 µm to 5 µm, and a sheet resistance of the second electrode 12 formed by the conductorization process is less than 100 Ω/□.

The step S12 includes etching the second electrode 12, to form the second groove 12v in the second electrode 12. The step S12 specifically includes: as shown in FIG. 7B, simultaneously etching the second electrode 12 and the base substrate 14 by an etching solution to form the first groove V0 in the base substrate 14 exposing a partial region of the second electrode 12, and forming the second groove 12V on a side of the second electrode 12 away from the first groove V0.

During etching, the base substrate 14 and the second electrode 12 may be anisotropically etched by using an etching solution such as KOH or TMAH. An etching rate at which the second electrode 12 is etched by using the etching solution is much lower than that for the base substrate 14, and a ratio of the etching rates is in a range from about 1:50 to 1:200. When the first groove V0 formed through etching in the base substrate 14 exposes a partial region of the second electrode 12, the etching is stopped, and at this time, the second groove 12V is formed through etching in the second electrode 12. A depth of the second groove 12v is in a range of (0.1 µm, 3 µm] or between 0.1 µm and 3 µm (not including 0.1 µm but including 3 µm).

It is understood that some regions of the base substrate 14 and the second electrode 12 do not need to be etched. For example, a peripheral region of the base substrate 14 and an edge portion of the second electrode 12 may be shielded by a mask pattern during etching.

Figure 7C:
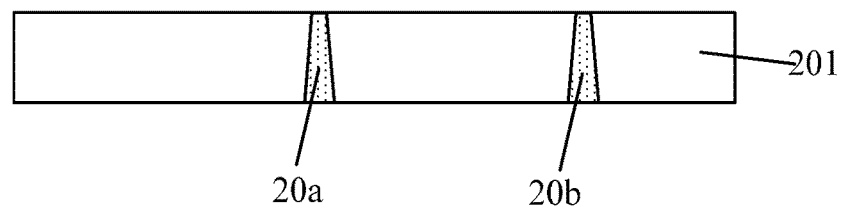

The step S13 includes as shown in FIG. 7C, performing laser-induced etching on regions of the substrate body 201 where the first via and the second via are to be formed, so as to modify the regions of the substrate body 201 where the first via and the second via are to be formed, and destroy Si—O molecular bonds inside the glass, so that when performing wet etching, an etching rate of the modified regions 20a and 20b is far greater than that of the unmodified regions.

Figure 7D:
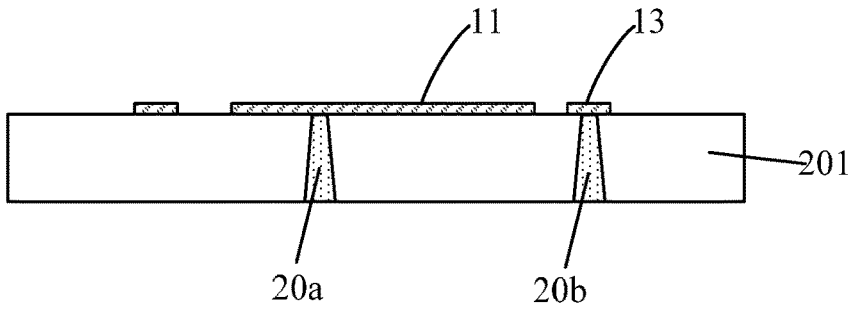

The step S14 includes, as shown in FIG. 7D, forming the first electrode 11 and the bonding layer 13 on the substrate body 201, such that the bonding layer 13 is arranged around the first electrode 11 with a space therebetween. In one example, the first electrode 11 and the bonding layer 13 each include a Ti/Au stack or a Cr/Au stack or the like, and the thicknesses of the first electrode 11 and the bonding layer 13 are in a range from 10 nm to 1000 nm.

Figure 7E:
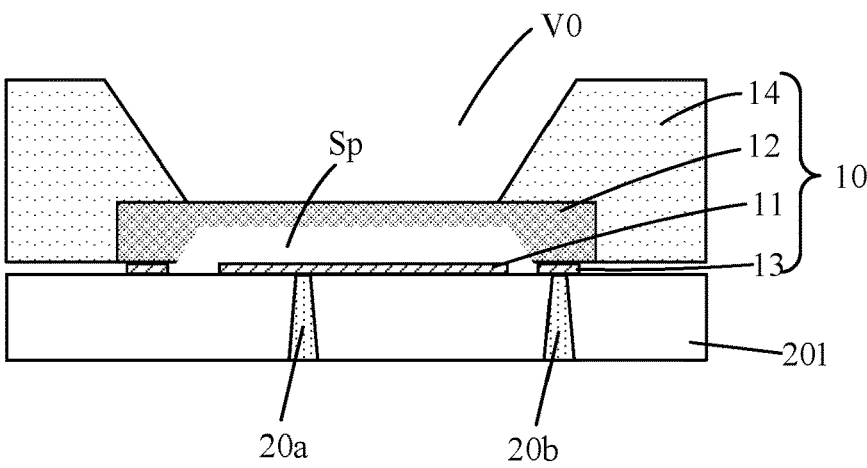

The step S15 includes, as shown in FIG. 7E, placing the second electrode 12 formed with the second groove 12v opposite to the first electrode 11, and forming the wafer bonding between the edge portion of the second electrode 12 and the bonding layer 13 by a gold-silicon eutectic method.

Figure 7F:
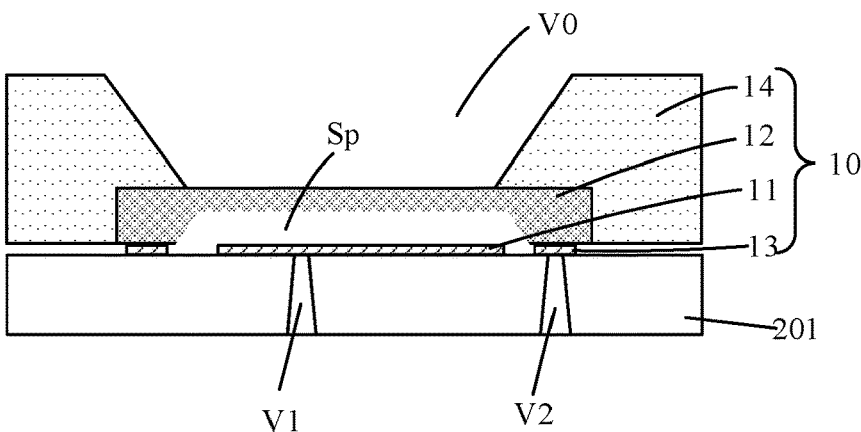

The step S21 includes, as shown in FIG. 7F, forming the first via V1 and the second via V2 in the substrate body 201. Specifically, the modified regions 20a and 20b formed in the step S13 may be etched by using hydrofluoric acid or potassium hydroxide, thereby forming the first via V1 and the second via V2. In one example, normal-temperature hydrofluoric acid may be used for etching, in which case etching angles of the first via V1 and the second via V2 are between 80° and 85°. In another example, the etching angles of the first via V1 and the second via V2 may reach in a range from 85° to 88° by using sodium hydroxide with a high temperature in a range from 100° C. to 120° C. for etching. The etching angle is an angle between a side of a longitudinal section of a via and a bottom of the via away from the sensor chip 10.

In the embodiment of the present disclosure, before the step S21, the first via V1 and the second via V2 are not yet formed in the substrate body 201, and a surface of the substrate body 201 is relatively flat. The second electrode 12 is bonded to the substrate body 201 through the bonding layer 13 before the vias are formed, so that the bonding firmness may be improved.

Figure 7G:
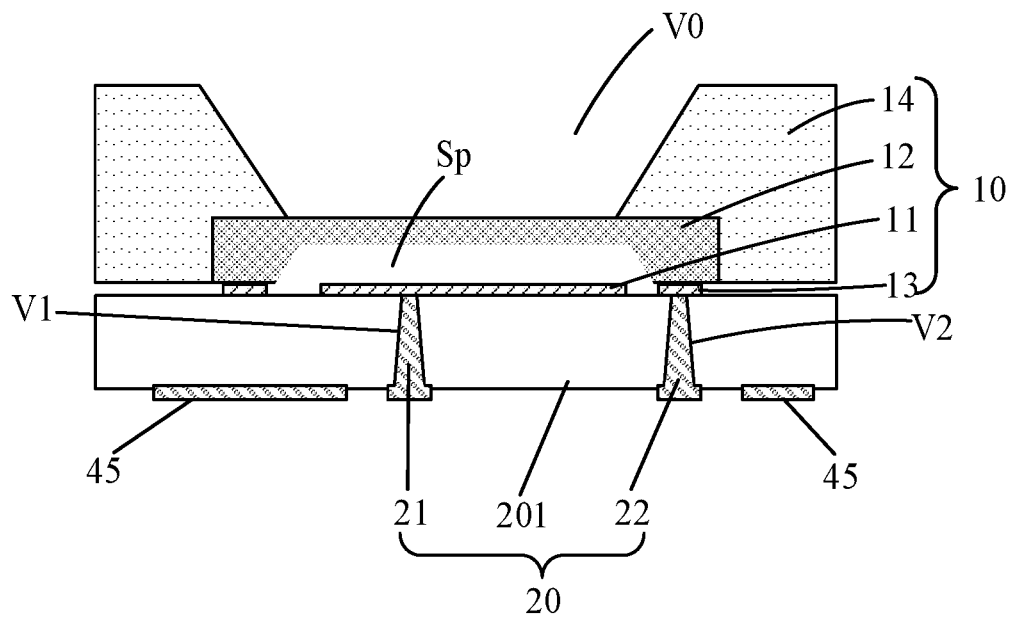

The step S22 includes, as shown in FIG. 7G, forming the first connection component 21 and the second connection component 22, such that the first connection component 21 passes through the first via V1 and is electrically connected to the first electrode 11. The second connection component 22 passes through the second via V2 and is electrically connected to the second electrode 12. Specifically, the step S22 may include: depositing a first adhesion layer in the first via V1 adhered to a wall of the first via V1 and depositing a second adhesion layer in the second via V2 adhered to a wall of the second via V2. The first adhesion layer and the second adhesion layer are made of the same material and may both include a Ti/Cu stack or a TaN/Cu stack. Then, the first via V1 is filled with a material such as Cu, W, or Al or the like, by electroplating to form the first body portion, and the second via V2 is filled with a material such as Cu, W, or Al or the like, to form the second body portion. The first connection component 21 includes: the first body portion and the first adhesion layer between the first body portion and the wall of the first via V1, and the second connection component 22 includes: the second body portion and the second adhesion layer between the second body portion and the wall of the second via V2.

As shown in FIG. 7G, the transmission line 45 is formed on the substrate body 201 while forming the first electrode 11 and the second electrode 12, and the material of the transmission line 45 may be the same as the material of the first connection component 21 and the second connection component 22. For example, the transmission line 45 includes a Ti/Cu stack or a TaN/Cu stack, or a metal layer such as Cu, W or Al or the like.

In some embodiments, the transmission line 45 and the first connection component 21 and the second connection component 22 are formed simultaneously, which can simplify the manufacturing process. Alternatively, the transmission line 45 and the first connection component 21 and the second connection component 22 may be formed separately in different steps.

Figure 7H:
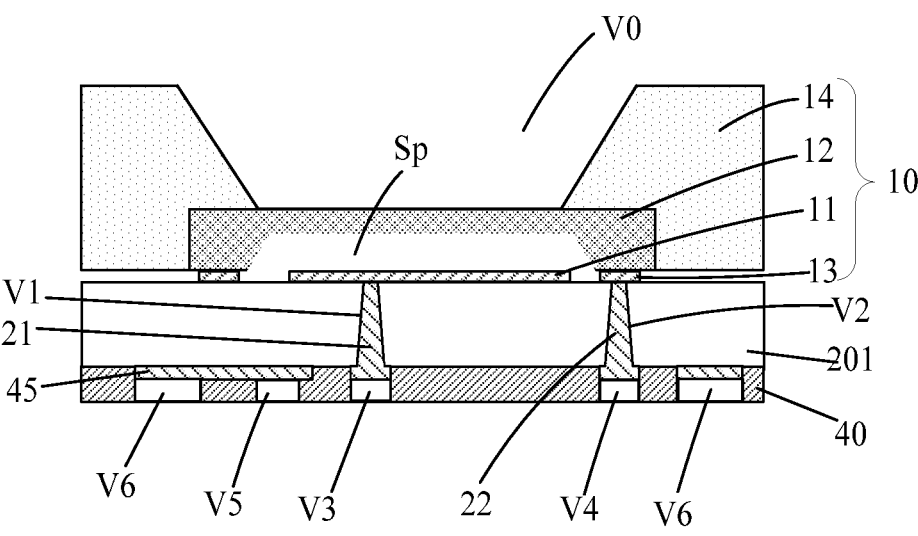

The step S23 includes, as shown in FIG. 7H, forming the dielectric layer 40, forming the third via V3 at a position corresponding to the first connection component 21 in the dielectric layer 40, and forming the fourth via V4 at a position corresponding to the second connection component 22 in the dielectric layer 40. In addition, the fifth via V5 and the sixth via V6 are further formed in the dielectric layer 40 at positions corresponding to the two ends of the transmission line 45, respectively.

In one example, the material of the dielectric layer 40 includes any one or more of PI, SiO, SiN. The thickness of the dielectric layer 40 is in a range from 0.1 μm to 10 μm.

Figure 7I:
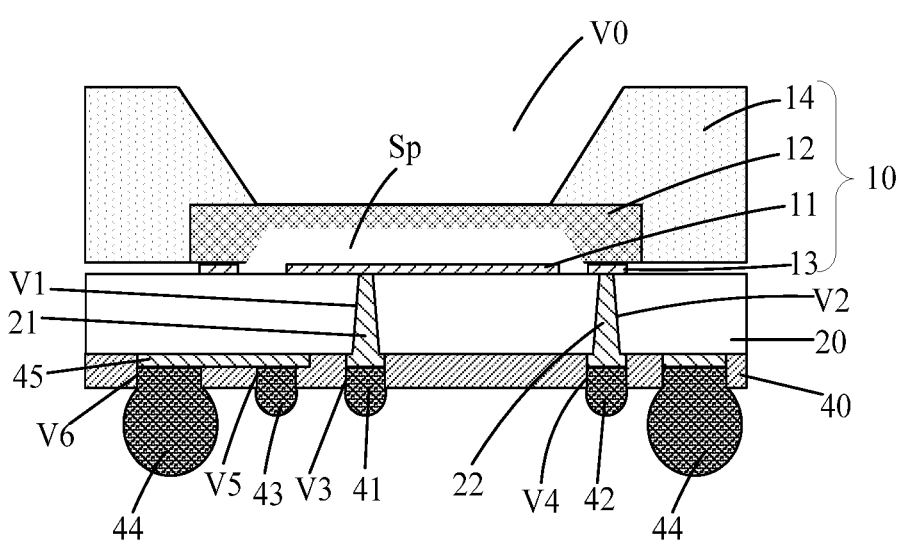

The step S24 includes, as shown in FIG. 7I, forming the first conductive component 41 and the second conductive component 42. At least a portion of the first conductive component 41 is positioned in the third via V3 and connected to the first connection component 21, and at least a portion of the second conductive component 42 is positioned in the fourth via V4 and connected to the second connection component 22.

In addition, the third conductive component 43 and the fourth conductive component 44 may be formed while forming the first conductive component 41 and the second conductive component 42. The third conductive component 43 is connected to the first end of the transmission line 45 through the fifth via V5, and the fourth conductive component 44 is connected to the second end of the transmission line 45 through the sixth via V6.

Specifically, when the first conductive component 41, the second conductive component 42, the third conductive component 43, and the fourth conductive component 44 are simultaneously formed, the method may include depositing a pad material NiPdAu in the third via V3, the fourth via V4, the fifth via V5 and the sixth via V6, and then forming bumps in the vias through a tinning process, such that the pad material and the bumps in the third via V3 form the first conductive component 41, the pad material and the bumps in the fourth via V4 form the second conductive component 42, the pad material and the bumps in the fifth via V5 form the third conductive component 43, and the pad material and the bumps in the sixth via V6 form the fourth conductive component 44.

The step S25 includes providing the integrated circuit chip 30 including the first detection terminal, the second detection terminal and the plurality of signal terminals.

Figure 7J:
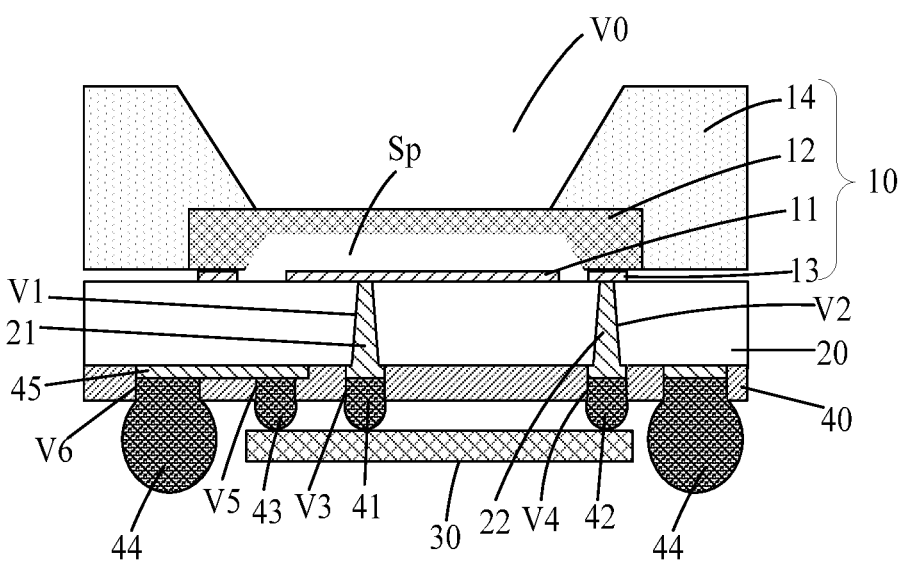

The step S26 includes, as shown in FIG. 7J, providing the integrated circuit chip 30 on a side of the adapter board 20 away from the sensor chip 10, and electrically connecting the first connection component 21 to the first detection terminal, and electrically connecting the second connection component 22 to the second detection terminal.

The electrically connecting the first connection component 21 to the first detection terminal specifically includes: electrically connecting the first conductive component 41 to the first detection terminal, and thus electrically connecting the first connection component 21 to the first detection terminal through the first conductive component 41. The electrically connecting the second connection component 22 to the second detection terminal specifically includes: electrically connecting the second conductive component 42 to the second detection terminal, and thus electrically connecting the second connection component 22 to the second detection terminal through the second conductive component 42.

The first conductive component 41 and the first detection terminal may be soldered by reflow soldering, and the second conductive component 42 and the second detection terminal may be soldered by reflow soldering.

Further, the step S26 includes: connecting the signal terminals of the integrated circuit chip 30 to the corresponding third conductive components 43. For example, the third conductive components 43 are soldered to the corresponding signal terminals by reflow soldering.

In a particular application, the fourth conductive component 44 may be electrically connected to the printed circuit board, such that the printed circuit board provides operating signals, e.g., power signals, clock signals, ground signals, etc., to the integrated circuit chip 30. The printed circuit board may further receive the pressure detection signal output from the integrated circuit chip 30.

The above steps S11 to S15 may be regarded as an embodiment of the step S1; the steps S21 to S26 may be regarded as an embodiment of the step S2.

FIGS. 8A to 8K are schematic diagrams illustrating a manufacturing procedure for an MEMS pressure sensor provided in further embodiments of the present disclosure. The procedure for manufacturing the MEMS pressure sensor is described in detail with reference to FIGS. 8A to 8K. The procedure for manufacturing the MEMS pressure sensor includes the following steps S200 to S207.

Figure 8A:
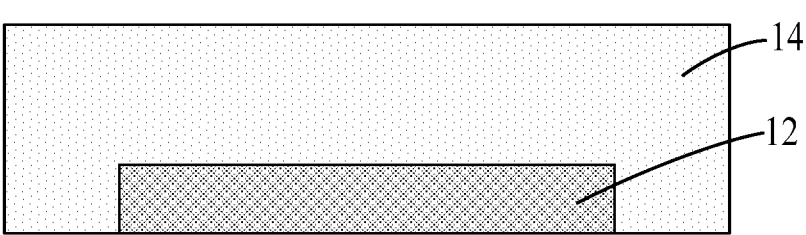
FIGS. 8A to 8K are schematic diagrams illustrating a manufacturing procedure for an MEMS pressure sensor provided in further embodiments of the present disclosure.
Figure 8B:
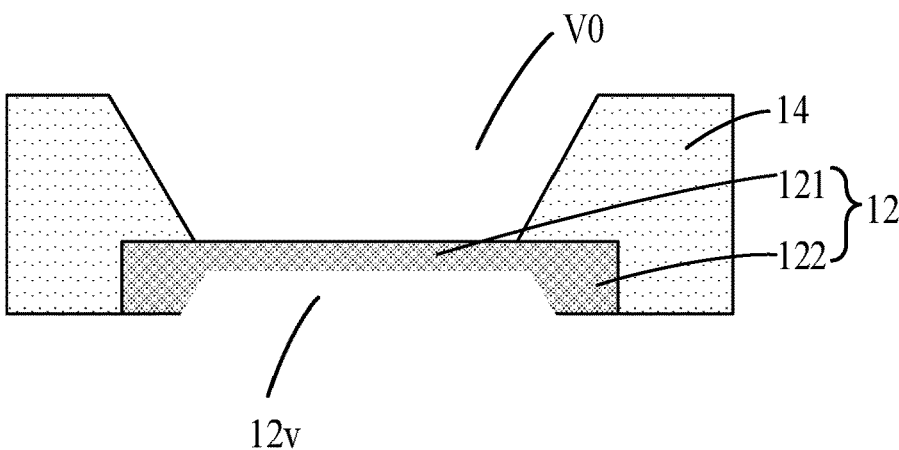

The step S200 includes, as shown in FIGS. 8A to 8B, performing a doping process on the first portion of the insulating substrate 141, to conductorize the first portion of the insulating substrate 141, thereby forming the second electrode 12, and the remaining portion of the insulating substrate 141 serves as the base substrate 14; etching the base substrate 14 and the second electrode 12 to form the first groove V0 penetrating through the base substrate 14 and the second groove 12v in the second electrode 12. For a specific process, reference is made to the steps S11 to S12 in the above embodiments, which are not described herein again.

Figure 8C:
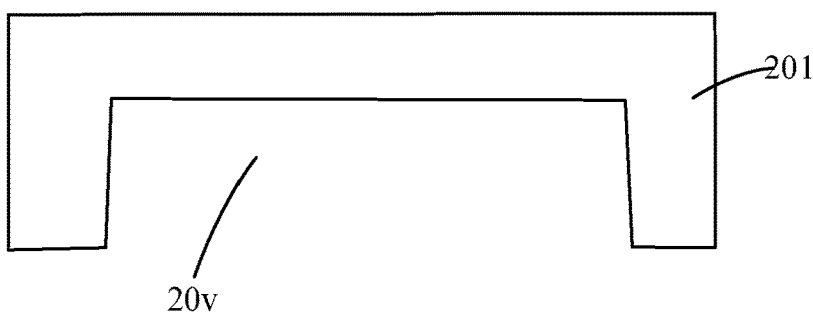

The step S201 includes, as shown in FIG. 8C, forming a receiving groove 20v in the substrate body 201. Specifically, the receiving groove 20v may be formed by HF etching, mechanical sand blasting and other processes, and the depth of the receiving groove 20v is in a range from 50 μm to 20 μm.

Figure 8D:
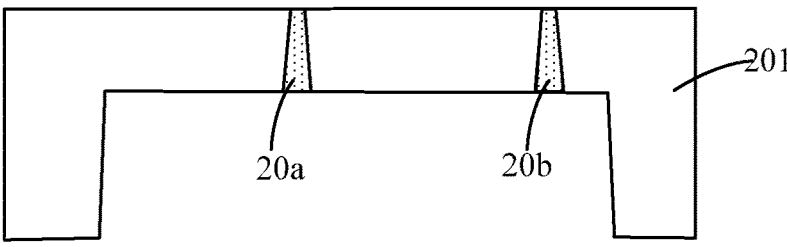

The step S202 includes, as shown in FIG. 8D, performing laser-induced etching on regions of the substrate body 201 where the first via V1 and the second via V2 are to be formed, so as to modify the regions of the substrate body 201 where the first via V1 and the second via V2 are to be formed, and destroy Si—O molecular bonds inside the glass, so that when performing wet etching, an etching rate of the modified regions 20a and 20b is far greater than that of the unmodified regions.

Figure 8E:
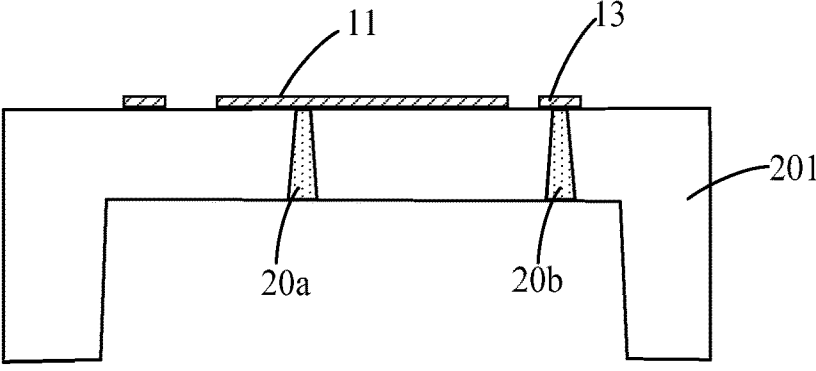
Figure 8F:
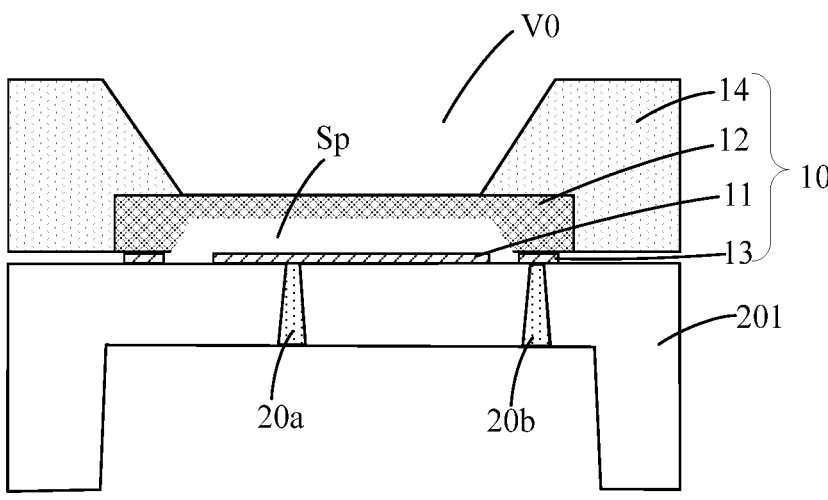
Figure 8G:
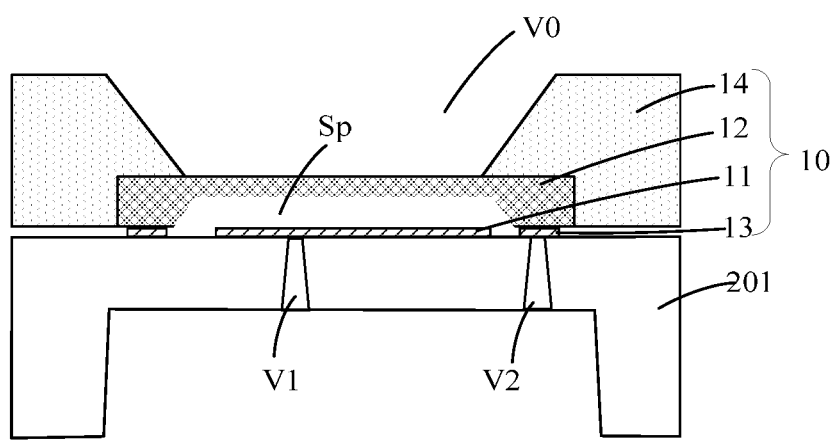

The step S203 includes, as shown in FIGS. 8E to 8G, forming the first electrode 11 and the bonding layer 13 on the substrate body 201; then placing the second electrode 12 formed with the second groove 12v opposite to the first electrode 11, and forming the wafer bonding between the edge portion of the second electrode 12 and the bonding layer 13 by a gold-silicon eutectic method; and then forming the first via V1 and the second via V2 in the substrate body 201.

Figure 8H:
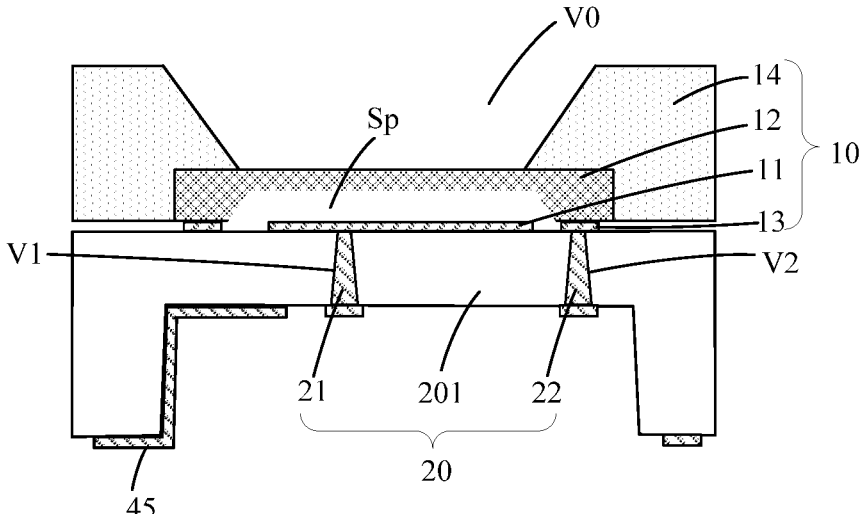

The step S204 includes, as shown in FIG. 8H, forming the first connection component 21, the second connection component 22 and the transmission line 45. The specific process is the same as the step S22 in the above embodiments, and is not described again here.

Figures 8I, 8J:
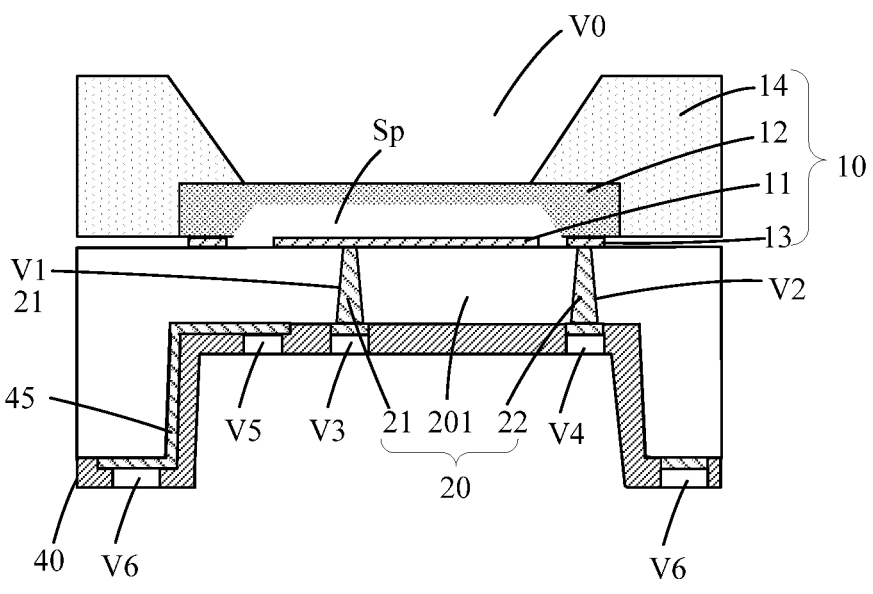

The step S205 includes, as shown in FIG. 8I, forming the dielectric layer 40, and the third via V3, the fourth via V4, the fifth via V5 and the sixth via V6 in the dielectric layer 40. Orthographic projections of the third via V3, the fourth via V4 and the fifth via V5 on the adapter board 20 are all located at the bottom of the receiving groove 20V, and an orthographic projection of the sixth via V6 on the adapter board 20 is located outside the receiving groove 20V.

The step S206 includes, as shown in FIG. 8J, forming the first conductive component 41, the second conductive component 42, the third conductive component 43 and the fourth conductive component 44. The specific process is the same as the step S24 in the above embodiment, and is not described again here.

Figure 8K:
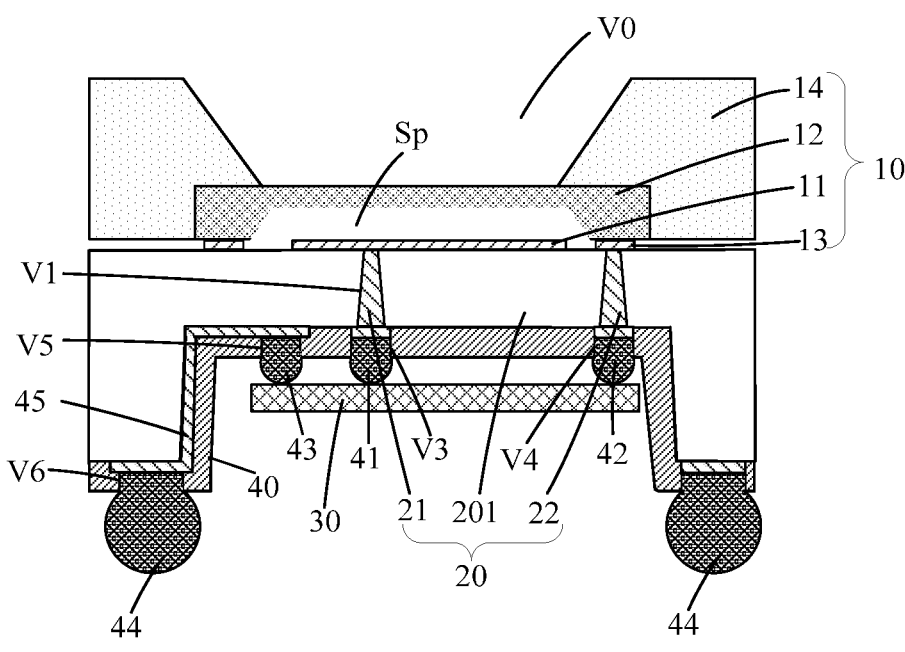

The step S207 includes, as shown in FIG. 8K, placing the integrated circuit chip 30 on a side of the adapter board 20 away from the sensor chip 10, and electrically connecting the first connection component 21 to the first detection terminal; electrically connecting the second connection component 22 to the second detection terminal; connecting the signal terminal of the integrated circuit chip 30 to the third conductive component 43.

Figure 9:
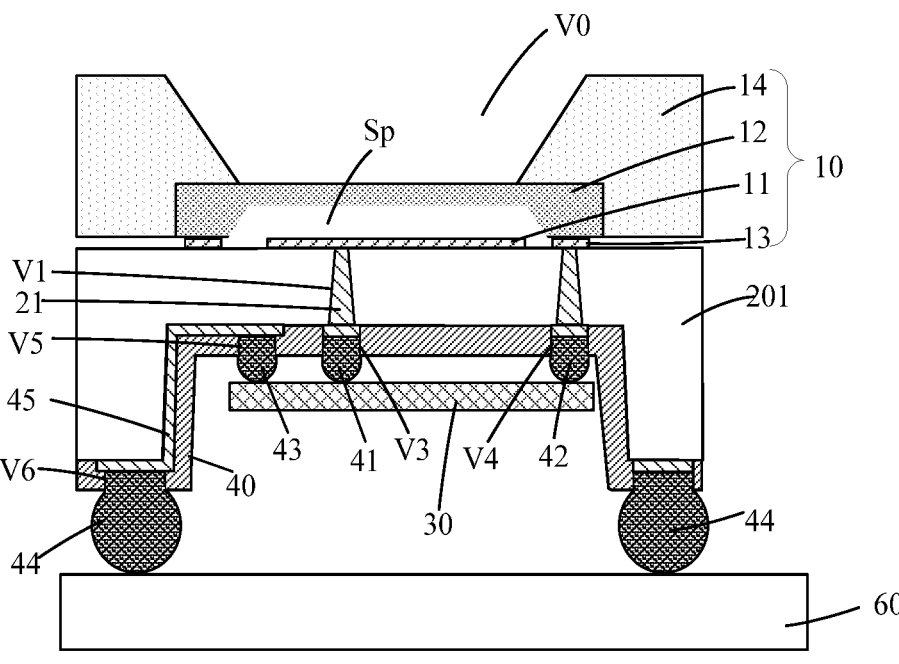
FIG. 9 is a schematic diagram of a pressure detection device provided in some embodiments of the present disclosure.

An embodiment of the present disclosure further provides a pressure detection device. FIG. 9 is a schematic diagram of a pressure detection device provided in some embodiments of the present disclosure. As shown in FIG. 9, the pressure detection device includes: the MEMS pressure sensor in the above embodiments and a printed circuit board 60. The printed circuit board 60 is electrically connected to the integrated circuit chip 30 in the MEMS pressure sensor, and is configured to provide an operating signal for the integrated circuit chip and receive a pressure detection signal output by the integrated circuit chip 30.

The pressure detection device may be used in an electronic device, such as a mobile phone, and the printed circuit board 60 may be a main board in the electronic device.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. An MEMS pressure sensor, comprising:

an adapter board;

an integrated circuit chip on one side of the adapter board; and a sensor chip on a side of the adapter board away from the integrated circuit chip; wherein the sensor chip comprises a first electrode and a second electrode, and the first electrode is between the adapter board and the second electrode; the second electrode comprises: a pressure-sensitive portion opposite to the first electrode and an edge portion surrounding the pressure-sensitive portion, the edge portion is fixed onto the adapter board by a bonding layer, and the first electrode, the second electrode, the bonding layer and the adapter board define a cavity;

wherein the first electrode and the second electrode of the sensor chip are electrically connected to the integrated circuit chip through the adapter board.

2. A pressure detection device, comprising:

the MEMS pressure sensor of claim 1; and a printed circuit board electrically connected to the integrated circuit chip and configured to provide an operating signal to the integrated circuit chip.

3. The MEMS pressure sensor of claim 1, wherein the integrated circuit chip comprises a first detection terminal and a second detection terminal; and the adapter board comprises: a substrate body, a first connection component and a second connection component, the first connection component passes through the first via in the substrate body and is electrically connected to the first electrode and the first detection terminal, and the second connection component passes through the second via in the substrate body and is electrically connected to the bonding layer and the second detection terminal.

4. The MEMS pressure sensor of claim 3, wherein the MEMS pressure sensor further comprises:

a dielectric layer on a side of the adapter board away from the sensor chip;

a first conductive component, wherein at least one portion of the first conductive component is in a third via in the dielectric layer, and the first conductive component electrically connects the first connection component to the first detection terminal; and a second conductive component, wherein at least one portion of the second conductive component is in a fourth via in the dielectric layer, and the second conductive component electrically connects the second connection component to the second detection terminal.

5. The MEMS pressure sensor of claim 4, wherein the MEMS pressure sensor further comprises:

a transmission line between the dielectric layer and the adapter board;

a third conductive component, wherein at least one portion of the third conductive component is in a fifth via in the dielectric layer, and the third conductive component electrically connects a signal terminal of the integrated circuit chip to the transmission line; and a fourth conductive component, wherein a portion of the fourth conductive component is in a sixth via in the dielectric layer and electrically connected to the transmission line.

6. The MEMS pressure sensor of claim 5, wherein the sensor chip further comprises a base substrate, and the second electrode is on a side of the base substrate close to the adapter board.

7. The MEMS pressure sensor of claim 6, wherein the MEMS pressure sensor further comprises a second groove on a surface of the second electrode close to the first electrode, an orthographic projection of the second groove on the adapter board covers an orthographic projection of the first electrode on the adapter board, and an orthographic projection of the bonding layer on the adapter board surrounds an orthographic projection of the second groove on the adapter board.

8. The MEMS pressure sensor of claim 1, wherein the sensor chip further comprises a base substrate, and the second electrode is on a side of the base substrate close to the adapter board.

9. The MEMS pressure sensor of claim 8, wherein the second electrode and the base substrate have a one-piece structure.

10. The MEMS pressure sensor of claim 8, wherein the MEMS pressure sensor further comprises a first groove on a side of the base substrate away from the adapter board to expose the pressure-sensitive portion of the second electrode.

11. The MEMS pressure sensor of claim 8, wherein the adapter board comprises a substrate body, and the base substrate and the substrate body are made of different materials.

12. The MEMS pressure sensor of claim 1, wherein the MEMS pressure sensor further comprises a second groove on a surface of the second electrode close to the first electrode, an orthographic projection of the second groove on the adapter board covers an orthographic projection of the first electrode on the adapter board, and an orthographic projection of the bonding layer on the adapter board surrounds an orthographic projection of the second groove on the adapter board.

13. The MEMS pressure sensor of claim 1, wherein the MEMS pressure sensor further comprises a receiving groove on a surface of the adapter board away from the sensor chip, and the integrated circuit chip is located in the receiving groove.

14. A method for manufacturing an MEMS pressure sensor, comprising:

forming a sensor chip on one side of an adapter board, wherein the sensor chip comprises a first electrode and a second electrode, the first electrode is provided between the adapter board and the second electrode, the second electrode comprises a pressure-sensitive portion opposite to the first electrode and an edge portion surrounding the pressure-sensitive portion, the edge portion is fixed onto the adapter board by a bonding layer, and the first electrode, the second electrode, the bonding layer and the adapter board define a cavity; and forming an integrated circuit chip on a side of the adapter board away from the sensor chip, and electrically connecting the first electrode and the second electrode of the sensor chip to the integrated circuit chip through the adapter board.

15. The method of claim 14, wherein the integrated circuit chip comprises a first detection terminal and a second detection terminal, and the adapter board comprises a substrate body;

the electrically connecting the first electrode and the second electrode of the sensor chip to the integrated circuit chip through the adapter board comprises:

forming a first via and a second via in the substrate body;

forming a first connection component and a second connection component, wherein the first connection component passes through the first via and is electrically connected to the first electrode, and the second connection component passes through the second via and is electrically connected to the bonding layer; and electrically connecting the first detection terminal to the first connection component, and electrically connecting the second detection terminal to the second connection component.

16. The method of claim 15, wherein after the forming the first connection component and the second connection component, the method further comprises:

forming a dielectric layer, forming a third via in the dielectric layer at a position corresponding to the first connection component, and forming a fourth via in the dielectric layer at a position corresponding to the second connection component; and forming a first conductive component and a second conductive component, wherein at least a portion of the first conductive component is located in the third via, and at least a portion of the second conductive component is located in the fourth via;

wherein the electrically connecting the first detection terminal to the first connection component, and the electrically connecting the second detection terminal to the second connection component comprises:

electrically connecting the first connection component to the first detection terminal through the first conductive component, and electrically connecting the second connection component to the second detection terminal through the second conductive component.

17. The method of claim 16, wherein prior to the forming the dielectric layer, the method further comprises: forming a transmission line on the adapter board;

after the forming the dielectric layer, the method further comprises:

forming a fifth via and a sixth via in the dielectric layer;

forming a third conductive component and a fourth conductive component, wherein the third conductive component is connected to one end of the transmission line through the fifth via, and the fourth conductive component is connected to the other end of the transmission line through the sixth via; and connecting a signal terminal of the integrated circuit chip to the third conductive component.

18. The method of claim 17, wherein the forming the transmission line is simultaneous with the forming the first connection component and the second connection component.

19. The method of claim 14, wherein the forming the sensor chip on one side of the adapter board comprises:

performing a doping process on a first portion of an insulating substrate to conductorize the first portion of the insulating substrate to form the second electrode, wherein a remaining portion of the insulating substrate is used as a base substrate;

etching the second electrode to form a second groove in the second electrode;

forming the first electrode and the bonding layer on the adapter board; and placing the pressure-sensitive portion of the second electrode opposite to the first electrode, and bonding the edge portion of the second electrode to the bonding layer.

20. The method of claim 19, wherein the etching the second electrode comprises:

simultaneously etching the second electrode and the base substrate by using etching liquid, to form a first groove in the base substrate to expose a portion of the second electrode, and form the second groove on a side of the second electrode away from the first groove.

* * * * *